US009256588B1

(12) United States Patent
Moscovich et al.

(10) Patent No.: US 9,256,588 B1
(45) Date of Patent: Feb. 9, 2016

(54) TRANSFERRING CONTENT TO A SUBSTANTIALLY SIMILAR LOCATION IN A VIRTUAL NOTEBOOK USING A STYLUS ENABLED DEVICE

(75) Inventors: Tomer Moscovich, San Francisco, CA (US); Bradley J. Bozarth, Sunnyvale, CA (US); Julien G. Beguin, San Francisco, CA (US); Ilya D. Rosenberg, Mountain View, CA (US); Tiffany Yun, Fremont, CA (US)

(73) Assignee: Amazon Technologies, Inc., Reno, NV (US)

( * ) Notice: Subject to any disclaimer, the term of this patent is extended or adjusted under 35 U.S.C. 154(b) by 147 days.

(21) Appl. No.: 13/247,605

(22) Filed: Sep. 28, 2011

(51) Int. Cl.
*G06F 17/20* (2006.01)
*G06F 17/24* (2006.01)

(52) U.S. Cl.
CPC .................................... *G06F 17/241* (2013.01)

(58) Field of Classification Search
CPC ...................................................... G06F 17/241
USPC .......................................... 175/230; 715/230
See application file for complete search history.

(56) References Cited

U.S. PATENT DOCUMENTS

| 7,996,589 | B2 * | 8/2011 | Schultz et al. ................... 710/73 |
| 8,126,878 | B2 * | 2/2012 | Krasnow ...................... 707/722 |
| 8,181,103 | B2 * | 5/2012 | Lin et al. ........................ 715/230 |
| 8,208,737 | B1 * | 6/2012 | Ie .................................... 382/229 |
| 2004/0021701 | A1 * | 2/2004 | Iwema et al. ................. 345/863 |
| 2005/0154760 | A1 * | 7/2005 | Bhakta et al. ............... 707/104.1 |
| 2009/0063492 | A1 * | 3/2009 | Meyyappan et al. ............. 707/9 |
| 2011/0087955 | A1 * | 4/2011 | Ho et al. ........................ 715/230 |
| 2011/0175855 | A1 * | 7/2011 | Youn et al. ..................... 345/179 |
| 2011/0320978 | A1 * | 12/2011 | Horodezky et al. ............ 715/823 |
| 2012/0221936 | A1 * | 8/2012 | Patterson et al. ............. 715/230 |
| 2013/0021281 | A1 * | 1/2013 | Tse et al. ....................... 345/173 |
| 2013/0047115 | A1 * | 2/2013 | Migos et al. .................. 715/776 |
| 2014/0062957 | A1 * | 3/2014 | Perski et al. ................... 345/174 |

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

* cited by examiner

*Primary Examiner* — Cesar Paula
*Assistant Examiner* — Mohammed-Ibrahim Zuberi
(74) *Attorney, Agent, or Firm* — Lee & Hayes, PLLC

(57) ABSTRACT

A device comprising a magnetic stylus, touch sensor, and reflective display provides new opportunities for content presentation and interaction. A user interface is configured to use input from the touch sensor, the stylus, and one or more magnetometers to modify content presented on the reflective display. This modification may include generating a virtual notebook comprising clippings of content.

26 Claims, 11 Drawing Sheets

TRANSFERRING CONTENT TO A SUBSTANTIALLY SIMILAR LOCATION IN A VIRTUAL NOTEBOOK USING A STYLUS ENABLED DEVICE

RELATED APPLICATION

The present application is related to U.S. application Ser. No. 12/846,539, filed on Jul. 29, 2010, entitled "Magnetic Touch Discrimination." This pending application is hereby incorporated by reference in its entirety. This application also hereby incorporates by reference in its entirety U.S. application Ser. No. 13/247,412, filed on Sep. 28, 2011, entitled "Magnetic Stylus."

BACKGROUND

Electronic devices that accept input from users are ubiquitous, and include cellular phones, eBook readers, tablet computers, desktop computers, portable media devices, and so forth. Increasingly, users desire these devices to accept input without the use of traditional keyboards or mice.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
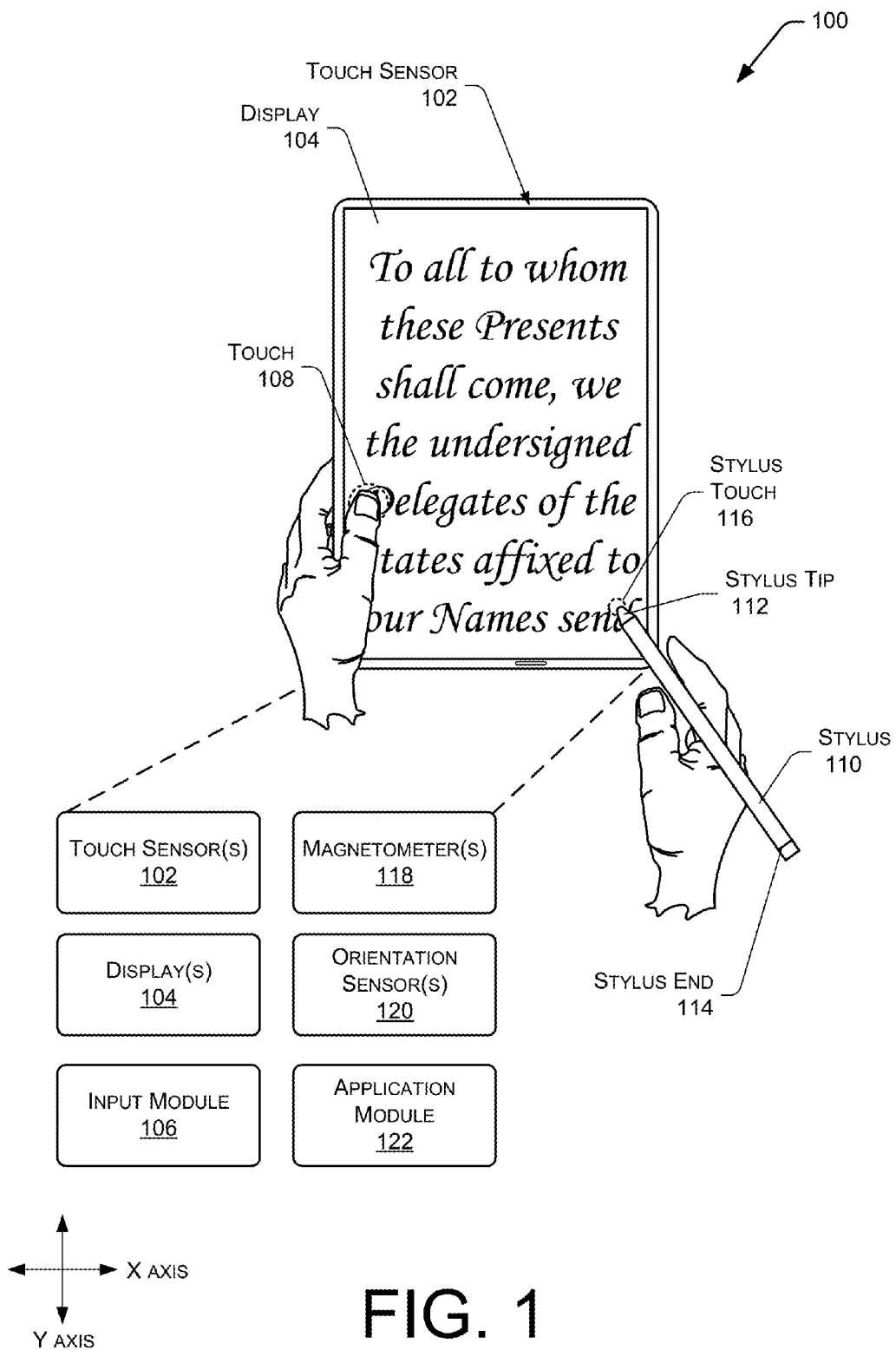
FIG. 1 depicts an electronic device configured to accept input via a touch sensor, a magnetic stylus, and one or more magnetometers.

Described herein are devices and techniques for accepting input in an electronic device. These devices may include a touch sensor, magnetic stylus containing a magnet, and one or more magnetic field sensors. By generating information from the magnetic field sensors about the position, orientation, tilt, rotation, and so forth of the magnetic stylus relative to the device, the described devices and techniques enable rich input modes alone or in combination with one another. Information may be presented to a user by a display device, such as a reflective electrophoretic display, a liquid crystal display (LCD), a light-emitting diode (LED) display, or the like.

Users may annotate content presented on the display by underlining or otherwise selecting a portion of the content. These handwritten underlines or other selection gestures may be processed into machine-generated shapes (e.g., straight lines under the text that was around, a perfect circle around a piece of text that a user has circled, etc.). The processed underlines may be configured to snap to proximate letters, words, sentences, paragraphs, and so forth. These underlines or other annotative marks may be added or removed without affecting the underlying content presented on the display.

Users may also create virtual notebooks based at least in part on content presented on the device. A user may select clip content, such as by underlining or otherwise selecting this content. In response, the clip content is copied or otherwise transferred to a virtual notebook page. During this transfer, a clip location indicating the relative or absolute position of the clip content on the page is maintained. When presented in the virtual notebook page, the clip content is presented in the same clip location. Therefore, if a user selects a paragraph at the top of a page as a clip content, the device may render this same clip content at the top of the virtual notebook page in the same position. In instances where the display of the device comprises an electronic paper display, the device may even continue to render the clip content while creating (i.e., rendering) the virtual notebook around this selected clip content. In some instances, an image or graphic may be selected for clipping by selecting an associated caption.

The virtual notebook may be accessible from a variety devices. The notebook may be associated with several pieces of content, or may be associated with a particular piece of content. For example, one virtual notebook may contain clippings from web pages, eBooks, and so forth while another virtual notebook may only contain clippings from a particular eBook.

A thumbnail view of a plurality of virtual notebook pages may be presented to aid in navigation between the pages of the virtual notebook. By providing thumbnail images where the relative positions on the page of the clippings have been retained, the user is able to readily use spatial memory to select a particular page of the notebook.

Illustrative Device

FIG. 1 depicts an electronic device 100 configured with a touch sensor, magnetometer, and other sensors. A touch sensor 102 accepts input resulting from contact and/or application of incident force, such as a user finger or stylus pressing upon the touch sensor. While the touch sensor 102 is depicted on the front of the device, it is understood that other touch sensors 102 may be disposed along the other sides of the device instead of, or in addition to, the touch sensor on the front. A display 104 is configured to present information to the user. In some implementations, the display 104 and the touch sensor 102 may be combined to provide a touch-sensitive display, or touchscreen display.

Within or coupled to the device, an input module 106 accepts input from the touch sensor 102 and other sensors. For example, FIG. 1 illustrates a broken line representing a user touch 108 on the touch sensor 102. FIG. 1 also depicts a stylus 110 having two opposing terminal structures, a stylus tip 112 and a stylus end 114. The stylus tip 112 is shown in contact with the touch sensor 102 as indicated by the stylus touch 116. In some implementations, the stylus tip 112 may be configured to be non-marking such that operates free from depositing a visible trace of material such as graphite, ink, or other material.

Returning to the sensors within the device 100, one or more magnetometers 118 are accessible to the input module 106. These magnetometers are configured to detect and in some implementations characterize impinging magnetic fields. One or more orientation sensors 120 such as accelerometers, gravimeters, and so forth may also be present. These sensors are discussed in more detail next with regards to FIG. 2.

The device 100 may further include an application module 122. The application module 122 is configured to interact with other elements such as the input module 106 to provide functions such as the user interface, underlining, generating a virtual notebook, and so forth.

Figure 2:
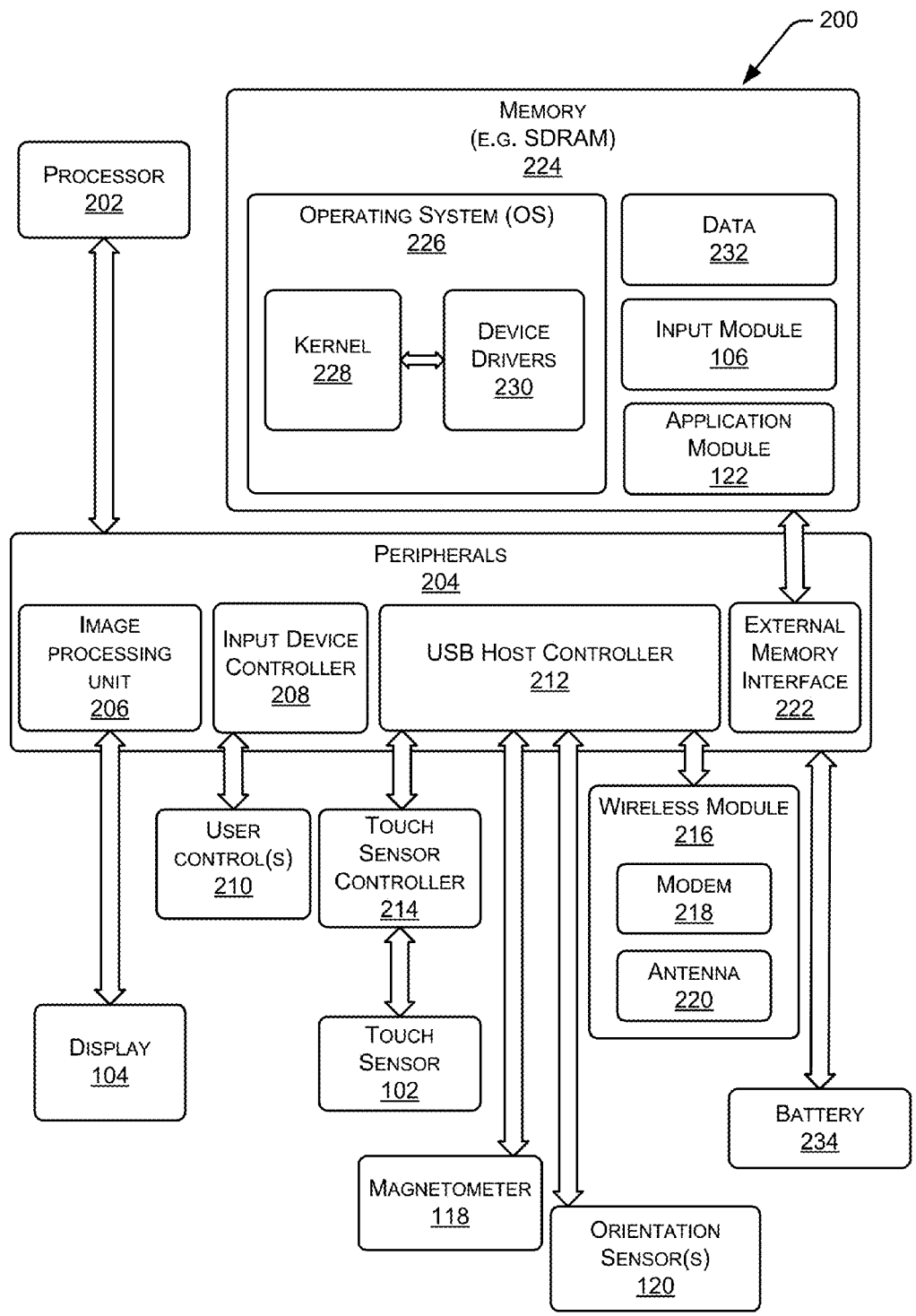
FIG. 2 is an illustrative schematic of the electronic device with an input module configured to use the touch sensor, the magnetic stylus, and the one or more magnetometers to accept user input.

FIG. 2 is an illustrative schematic 200 of the electronic device 100 of FIG. 1. In a very basic configuration, the device 100 includes components such as a processor 202 and one or more peripherals 204 coupled to the processor 202. Each processor 202 may itself comprise one or more processors.

An image processing unit 206 is shown coupled to one or more display components 104 (or "displays"). In some implementations, multiple displays may be present and coupled to the image processing unit 206. These multiple displays may be located in the same or different enclosures or panels. Furthermore, one or more image processing units 206 may couple to the multiple displays.

The display 104 may present content in a human-readable format to a user. The display 104 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays (LCDs), time multiplexed optical shutter displays, light emitting diode (LED) displays, and so forth. When multiple displays are present, these displays may be of the same or different types. For example, one display may be an electrophoretic display while another may be a liquid crystal display. The display 104 may be color or monochrome.

For convenience only, the display 104 is shown in FIG. 1 in a generally rectangular configuration. However, it is understood that the display 104 may be implemented in any shape, and may have any ratio of height to width. Also, for stylistic or design purposes, the display 104 may be curved or otherwise non-linearly shaped. Furthermore the display 104 may be flexible and configured to fold or roll.

The content presented on the display 104 may take the form of user input received when the user draw, writes, otherwise manipulates controls such as with the stylus. The content may also include electronic books or "eBooks." For example, the display 104 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user actuable controls 210. These user actuable controls 210 may have dedicated or assignable operations. For instance, the actuable controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes a touch sensor controller 214. The touch sensor controller 214 couples to the processor 202 via the USB host controller 212 (as shown). In other implementations, the touch sensor controller 214 may couple to the processor via the input device controller 208, inter-integrated circuit ("I$^2$C"), universal asynchronous receiver/transmitter ("UART"), or serial peripheral interface bus ("SPI"), or other interfaces. The touch sensor controller 214 couples to the touch sensor 102. In some implementations multiple touch sensors 102 may be present.

The touch sensor 102 may comprise various technologies including interpolating force-sensing resistance (IFSR) sensors, capacitive, magnetic, force sensitive resistors, acoustic, optical, and so forth. The touch sensor 102 may be configured such that user input through contact or gesturing relative to the device 100 may be received.

The touch sensor controller 214 is configured to determine characteristics of interaction with the touch sensor. These characteristics may include the location of the touch on the touch sensor, magnitude of the force, shape of the touch, and so forth. In some implementations, the touch sensor controller 214 may provide some or all of the functionality provided by the input module 106, described below.

The magnetometer 118 may couple to the USB host controller 212, or another interface. The magnetometer 118, allows for the detection and characterization of an impinging magnetic field. For example, the magnetometer 118 may be configured to determine a field strength, angular bearing, polarity of the magnetic field, and so forth. In some implementations, the magnetometer may comprise a Hall-effect device. Magnetic fields, particularly in the environment within which electronic devices operate, are predictable and well understood. As a result, it becomes possible to use one or more magnetometers to determine presence and in some implementations the position, orientation, rotation, and so forth of the magnetic stylus. A plurality of magnetometers 118 may be used in some implementations.

One or more orientation sensors 120 may also be coupled to the USB host controller 212, or another interface. The orientation sensors 120 may include accelerometers, gravimeters, gyroscopes, proximity sensors, and so forth. Data from the orientation sensors 120 may be used at least in part to determine the orientation of the user relative to the device 100. Once an orientation is determined, input received by the device may be adjusted to account for the user's position. For example, when the user is holding the device in a portrait orientation the left and right edges of the touch sensor the input module 106 designates these areas as likely holding touch areas. Thus, touches within those areas biased in favor of being categorized as holding touches, rather than input touches.

The USB host controller 212 may also couple to a wireless module 216 via the universal serial bus. The wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, the device 100 may include a wired network interface.

The device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 224 may store an operating system 226 comprising a kernel 228 operatively coupled to one or more device drivers 230. The device drivers 230 are also operatively coupled to peripherals 204, such as the touch sensor controller 214. The external memory 224 may also store data 232, which may comprise content objects for consumption on eBook reader device 100, executable programs, databases, user settings, configuration files, device status, and so forth. Executable instructions comprising an input module 106 may also be stored in the memory 224. The input module 106 is configured to receive data from the touch sensor controller 214 and generate input strings or commands. In some implementations, the touch sensor controller 214, the operating system 226, the kernel 228, one or more of the device drivers 230, and so forth, may perform some or all of the functions of the input module 106.

One or more batteries 234 provide operational electrical power to components of the device 100 for operation when the device is disconnected from an external power supply. The device 100 may also include one or more other, non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 214 and the USB host controller 212, are shown for emphasis. There are couplings between many of the components illustrated in FIG. 2, but graphical arrows are omitted for clarity of illustration.

Illustrative User Interface

Figure 3:
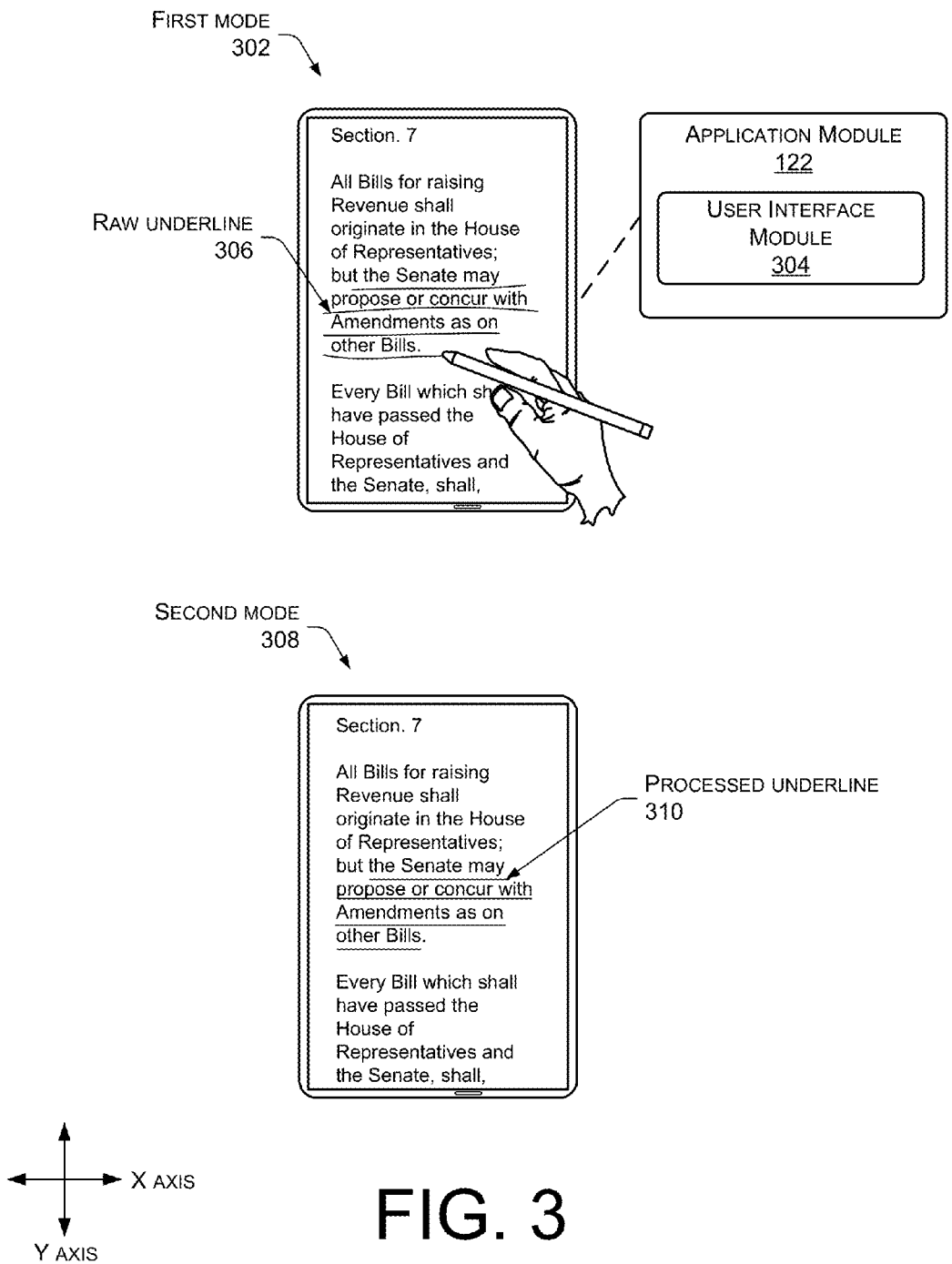
FIG. 3 depicts a user underlining text presented on a display with a stylus and presenting a processed underline.

1. FIG. 3 depicts a user underlining text presented on a display with a stylus and presenting a processed underline. Users may annotate information presented on the display 104 of the device with underlines. As shown here, in a first mode 302 a user interface module 304 is configured to present part of an eBook and respond to user inputs. Here, the user has made an underline gesture to form a raw underline 306, drawing lines underneath text for particular emphasis. The raw underline in some implementations comprises an underline generated prior to removal of contact of a finger, the stylus 110, or other instrument from the touch sensor 102 during the underline gesture. In this example, the user has underlined by hand the words "the Senate may propose or concur with Amendments as on other Bills."

The user interface module 304 may be configured to process and clean up these user inputs. As shown here, in the second mode 308 the user interface module 304 has removed the raw underline 306 from the display 104 and replaced it with a processed underline 310. In some implementations, the processed underline comprises an underline generated by the user interface module 304 after removal of contact of a finger, the stylus 110, or other instrument from the touch sensor 102. This processing thus assists the user in generating tidy annotations, as well as unambiguously underlining particular portions of the presented content. As described below with regards to FIG. 8, these underlines may be used to provide for or initiate other functions such as selecting content for clipping and placement into a virtual notebook.

Figure 4:
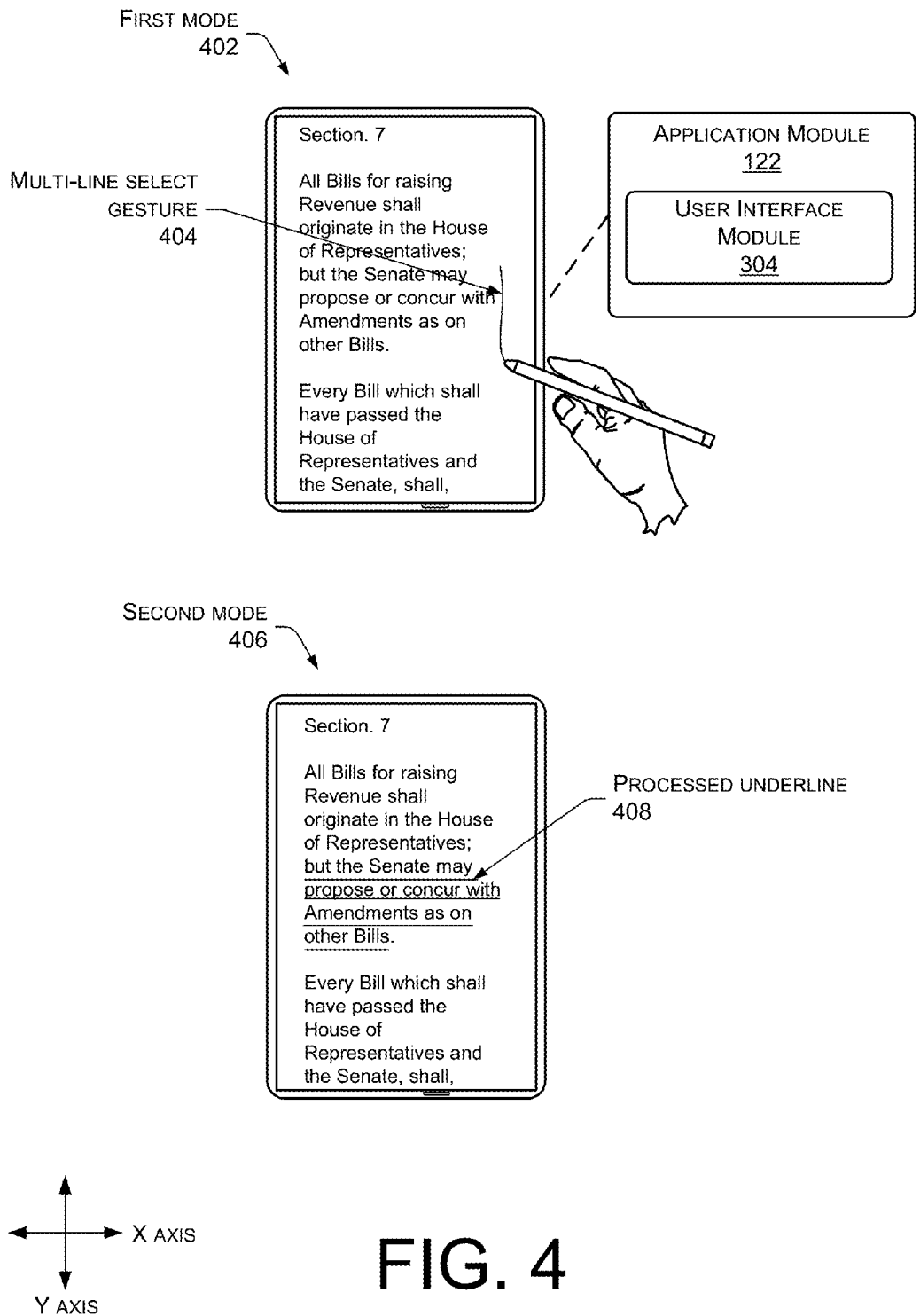
FIG. 4 depicts an alternative gesture for underlining text presented on the display.

FIG. 4 depicts an alternative gesture for underlining text present on the display. Blocks of content such as several lines or entire paragraphs of text may be selected by using other gestures. As shown here, in a first mode 402 the text of an eBook is presented with a multi-line select gesture 404 comprising a line drawn vertical relative to the orientation of text on the page. The user interface module 304 may be configured to recognize this multi-line select gesture 404 as an input to select the proximate text.

As a result, as shown in the second mode 406, the user interface module 304 has generated a processed underline 408 corresponding to the gesture. As shown in this example, the underline starts one word earlier compared to the prior example in FIG. 3. In response to the multi-line select gesture 404, the system may be configured to highlight the entire line as shown here, highlight entire sentences which extend into the highlighted area, and so forth.

Figure 5:
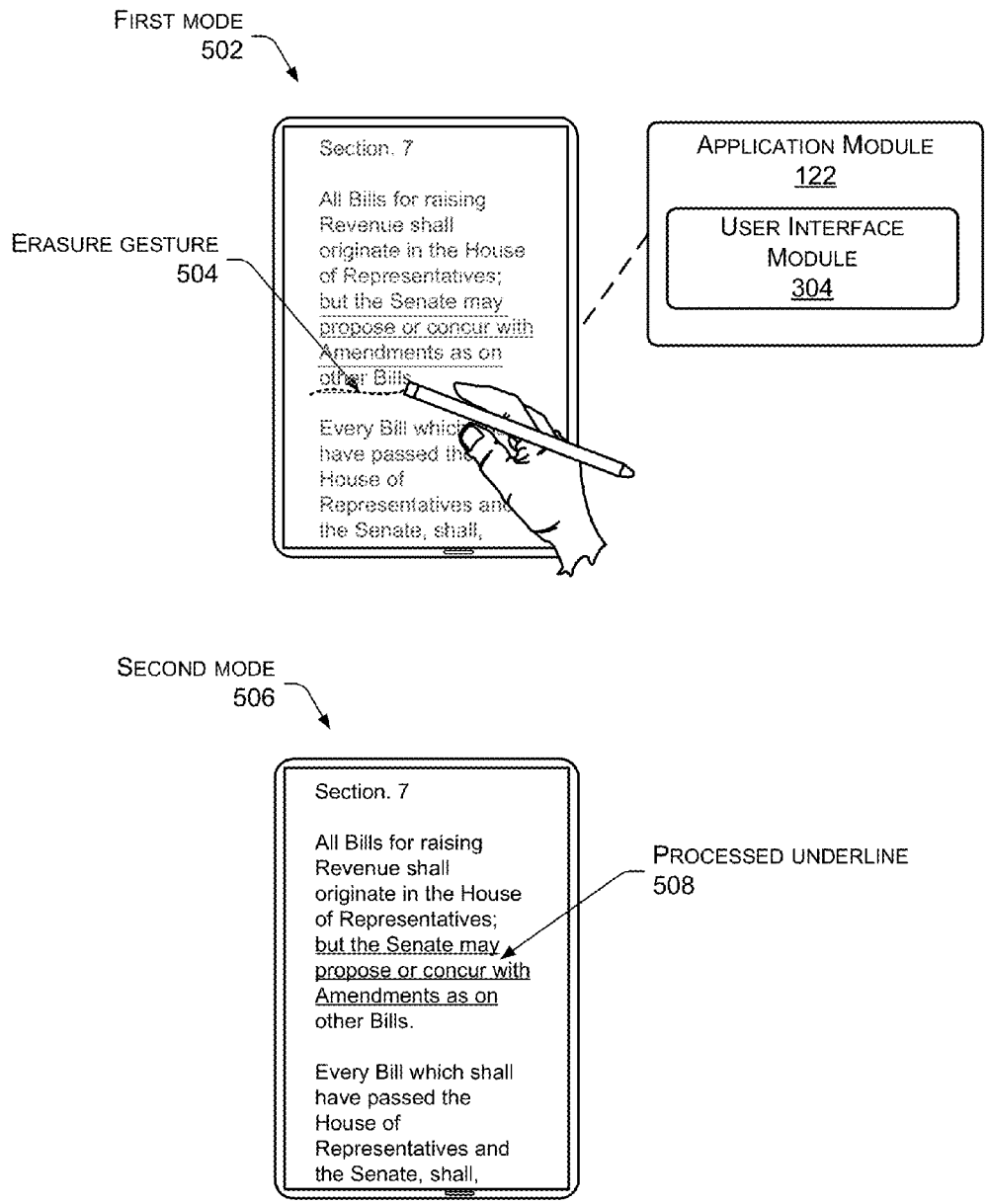
FIG. 5 depicts removing an underline with the stylus using an erasure gesture.

FIG. 5 depicts removing an underline with the stylus 110. Just as the stylus 110 in conjunction with the touch sensor 102 may be used to generate underlines, these underlines may be removed. Here, in a first mode 502 the user has made an erasure gesture 504. This erasure gesture 504 may comprise placement of the stylus end 114 proximate to the touch sensor 102 and drawing the stylus end 114 along the surface of the touch sensor 102 in a line generally corresponding to at least a portion of the existing underline.

The user interface module 304, detecting this erasure gesture 504, as shown in a second mode 506 has removed a portion of the underline. The underlying text remains unaffected. The user interface module 304 may receive the erasure gesture via the input module 106 which may provide the location and orientation of the stylus 110, as well as touch input from the touch sensor 102.

The processes in this disclosure may be implemented by the architectures described in this disclosure, or by other architectures. These processes described in this disclosure are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 6:
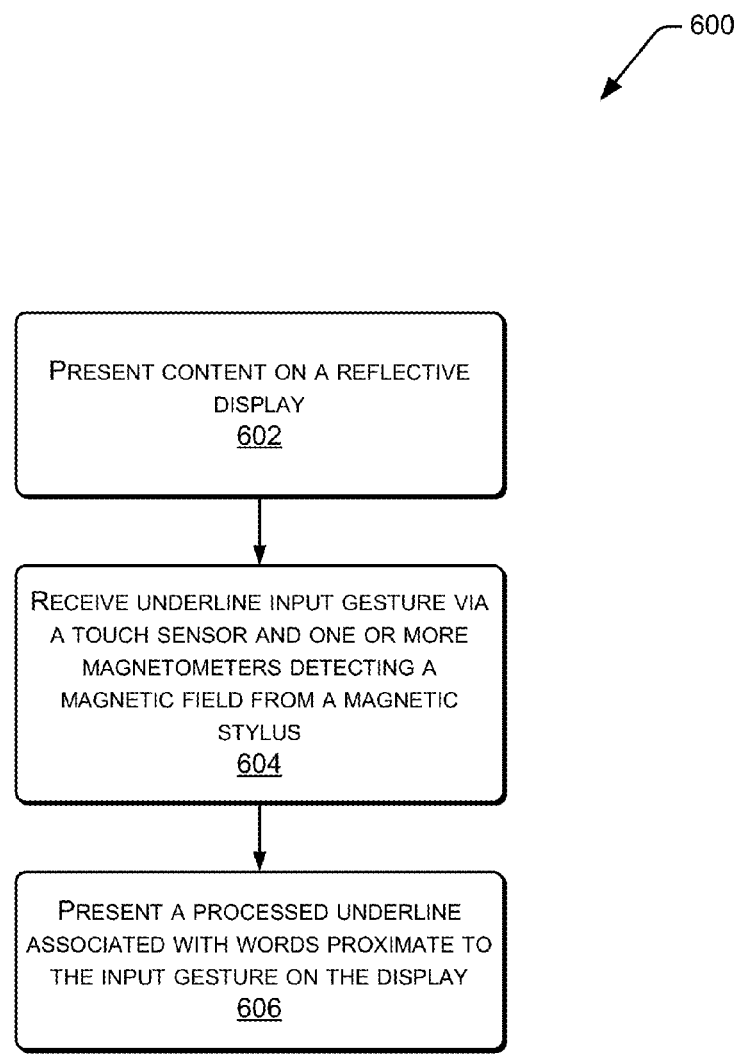
FIG. 6 is an illustrative process of presenting a processed underline.

FIG. 6 is an illustrative process 600 of presenting a processed underline. This process may be used by the user interface module 304 in some instances. At 602, content is presented on the display. For example, an eBook may be presented on an reflective electrophoretic display or any other type of display.

At 604, an underline input gesture is received via input from the touch sensor 102 and the one or more magnetometers 118 detecting the magnetic field from the magnetic stylus 110. The touch sensor 102 provides X-Y coordinates on the touch sensor 102, and may provide other information such as shape of the touch, area of the touch, pressure of the touch, and so forth. The magnet within the stylus 110 generates a magnetic field which is detectable by the one or more magnetometers 118. An orientation of the stylus 110 relative to the touch sensor may be determined by detecting the polarity of this magnetic field, allowing for distinction between which end of the stylus 110 is in contact with the touch sensor 102. For example, the stylus tip 112 may be determined to be in contact with the touch sensor 102 proximate to words on the display via data from the magnetometer 118 and the data from the touch sensor 102. As described above, the touch sensor 102 may comprise various technologies including interpolating force-sensing resistance (IFSR) sensors, capacitive, magnetic, force sensitive resistors, acoustic, optical, and so forth.

At 606, a processed underline associated with words proximate to the input gesture is presented. Continuing the example, the irregular hand-drawn line presented on the display 104 in FIG. 3 may be replaced with a straight horizontal line under the text. The processed underline results in a cleaner display of information, as well as providing an unambiguous selection which may be used for other functions, such as clipping as described below.

Figure 7:
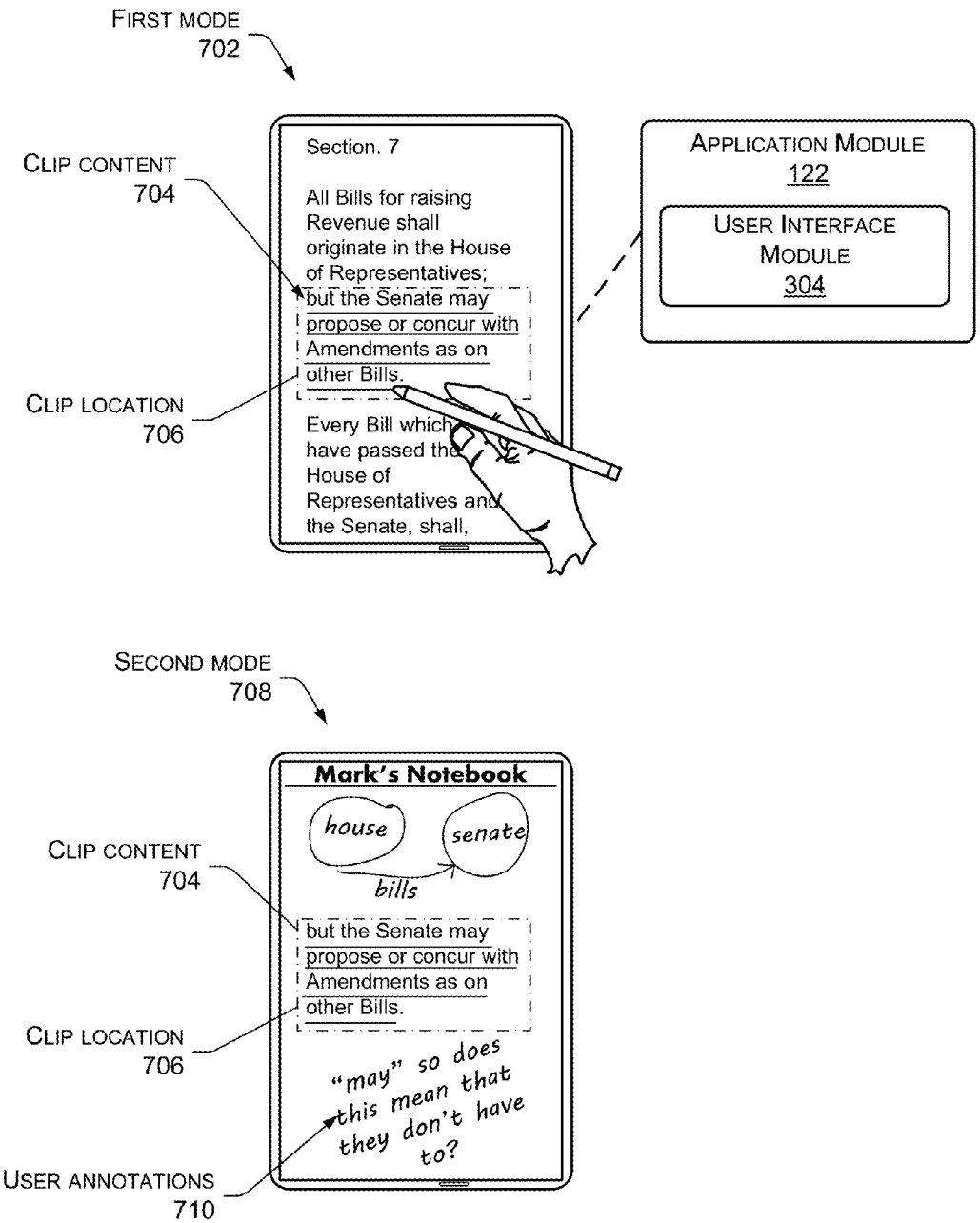
FIG. 7 depicts a user selecting clip content and creating a virtual notebook containing the clip content.

FIG. 7 depicts a user selecting clip content and creating a virtual notebook containing the clip content. Users may create virtual notebooks based at least in part on content presented on the device. As shown here, in a first mode 702 the user interface module 304 is presenting text including clip content 704 at a clip location 706. The clip content 704 comprises those words which have been selected, such as by underlining shown here and as described above. In other implementations other gestures may indicate clip content, such as drawing a box or circle around desired content, bracketing content, and so forth. The clip content 704 may comprise the text, formatting, color, background image, page layout, graphics, and so forth associated with the selection. In some implementations the clip content 704 may include contextual information such as data about surrounding text, overall page layout, user interface parameters available at the time of selection, and so forth.

Users may underline or otherwise select several different parts of the content. In some implementations, the user interface module may be configured to merge two sets of underlines and corresponding clippings when within a pre-determined distance of one another. For example, underlines which are within one word of one another may be merged. Likewise, a single underline or clipping may be separated into two or more sets of underlines and clippings, such as by deleting a portion of the underline. The sequence of selection of underlines when joining or the direction of a gesture when splitting may be configured to determine how to present related clippings. For example, a selection of an underline on the right followed by a line connecting to an underline on the left may be configured to remove an individual clipping from the content on the left and merge it with an individual clipping for the content on the right. In another implementation, merged clipping may remain separately displayed within the virtual notebook while a link within the virtual notebook between the two clippings is provided.

In one implementation, the user may access the virtual notebook by tapping the touch sensor 102 with the stylus 110 on the underlined clip content 704. The virtual notebook is shown here in a second mode 708 as generated by the user interface module 304 on the device 100.

In the second mode 708, the virtual notebook presents the clip content 704 in the same clip location 706 on the display 104. This location may be relative (such as ⅓ from the top of the displayed page) or absolute (such as start at pixel row 183, column 27). The clip content 704 may be configured to retain its overall appearance such as font, size, color, background, and so forth when in the virtual notebook.

Humans recognize information by physical arrangement as well as by content. As a result, placement of the clip content at the same clip location in the virtual notebook aids the user in finding particular content. For example, the user may not know exactly what the text to search for, but may recall that the clip content of interest was located at about the middle of the page. As a result, the user may locate pages by the physical arrangement.

in addition, by presenting the clip location 706 at the same location, distraction to the user is minimized during transitions between viewing content and viewing the notebook. Furthermore, with some display technologies maintaining the position of clip content at the clip location may improve the user experience. For example, cholesteric displays may produce some ghosting during transition between presented images. By maintaining the clip content in the same location, for the clipped content no transition occurs, thus such ghosting may be minimized.

Virtual notebooks may be associated with a particular set of devices, device, user, piece of content, and so forth. For example, a virtual notebook may be configured to be associated with a particular user accessing a particular eBook. Or that particular user may have a virtual notebook used for a plurality of different pieces of content, such as several eBooks.

In some implementations, the content may be presented on a first device while the virtual notebook may be presented on a second device. The devices may communicate with one another, such as via the wireless model 216.

Figure 8:
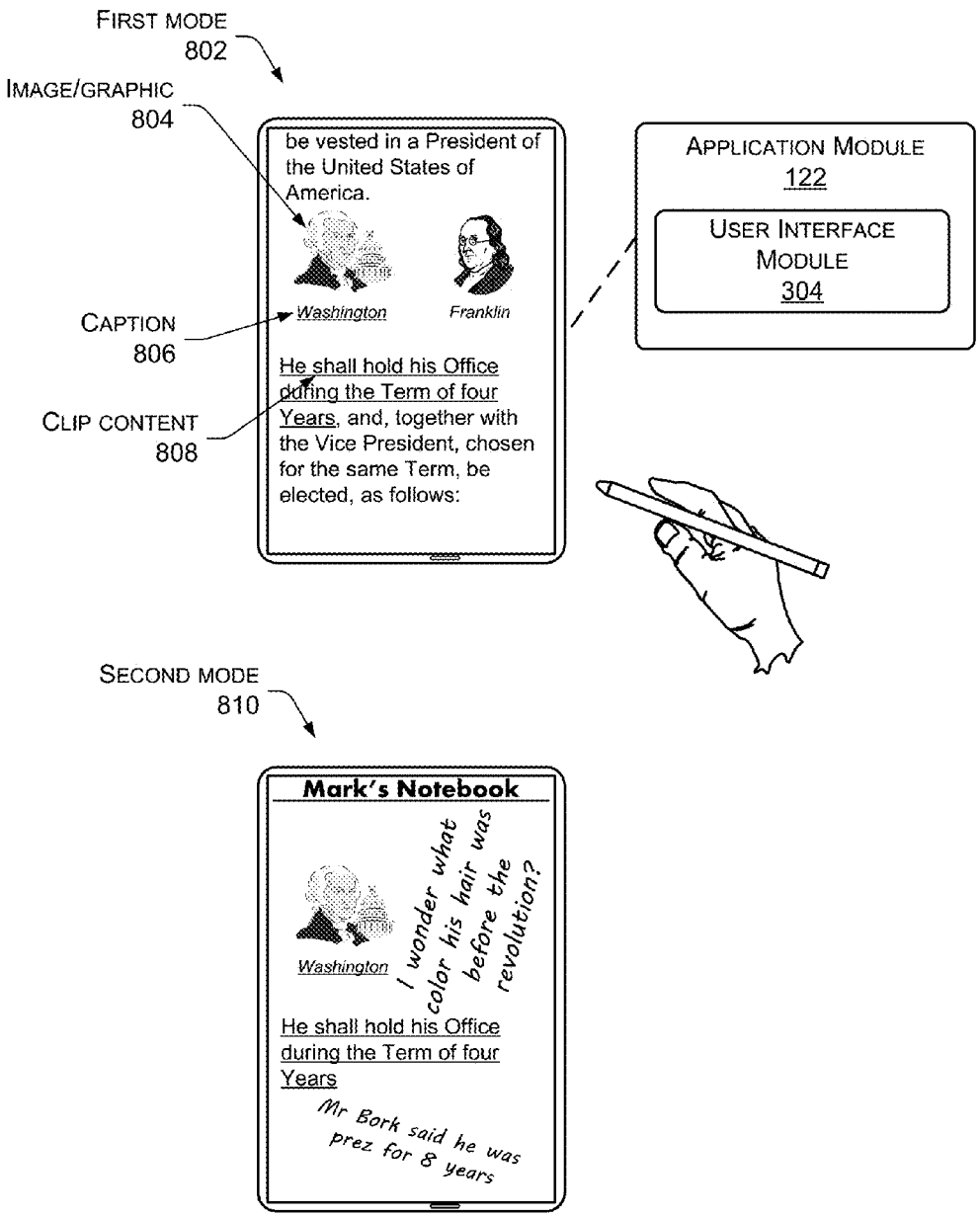
FIG. 8 depicts selecting an image as part of the clip content by underlining an image caption.

FIG. 8 depicts selecting an image as part of the clip content by underlining an image caption. Content may include images or graphics such as pictures, charts, video, and so forth. The user may wish to clip these images or graphics and place them in the virtual notebook.

As shown here, in a first mode 802 the user interface module 304 presents an eBook having an image/graphic 804 of George Washington. As illustrated, the image/graphic 804 has a corresponding caption 806. The user may underline or otherwise select the caption and other text as shown here as part of clip content 808.

A second mode 810 depicts the device presenting the virtual notebook which includes the George Washington image/graphic 804, caption 806, and corresponding text which together comprises the clip content 808 for this clipping. The image/graphic 804 and caption 806 may be associated with one another via relative placement, embedded coding within the content, and so forth. As described above, the clip location is maintained with the clip content 808 in the clipping.

In another implementation, a user may select the image/graphic 804 by underlining or otherwise selecting a reference to the image/graphic 804 which appears elsewhere within the topic. For example, a user underlining the phrase " . . . the graph shown in figure A clearly shows economic effects . . . " would select the underlined text as well as the referenced figure.

Figure 9:
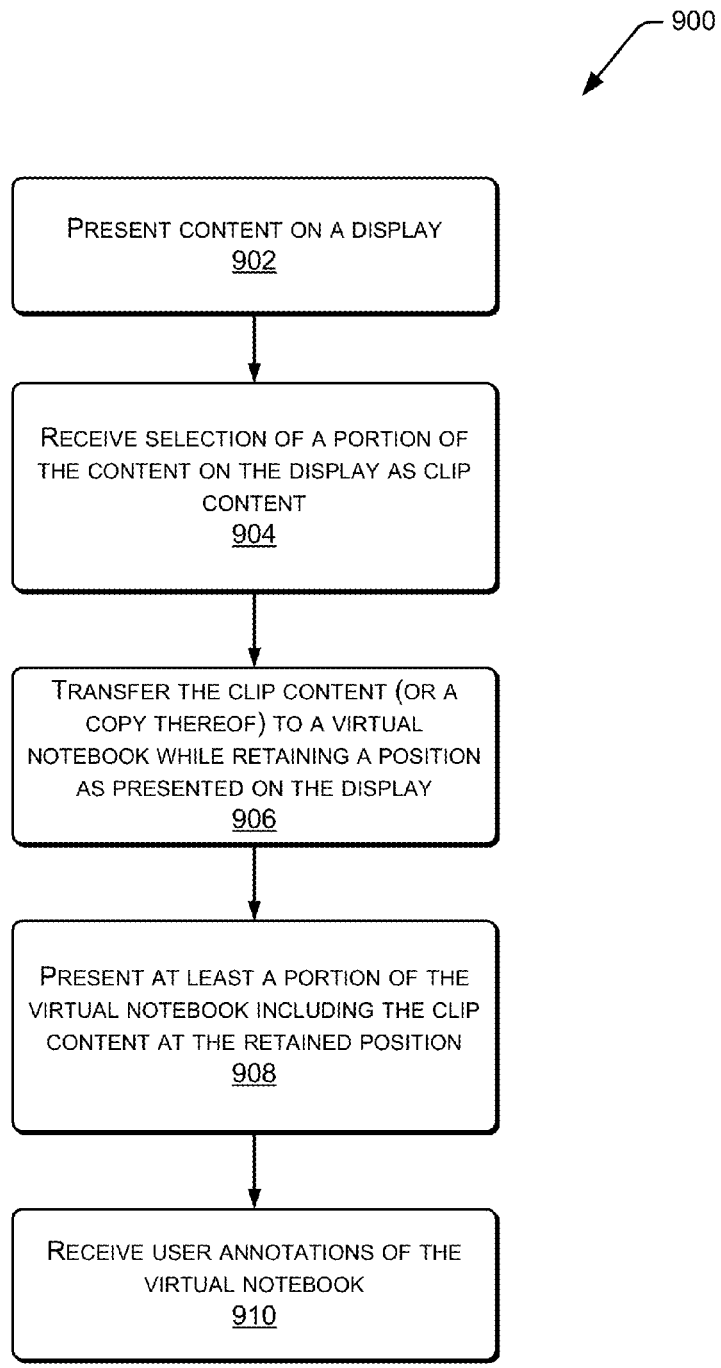
FIG. 9 is an illustrative process of generating a virtual notebook containing clip content.

FIG. 9 is an illustrative process 900 of generating a virtual notebook containing clip content. At 902, content is presented on the display 104. For example, an eBook may be presented on the reflective electrophoretic display or any other type of display.

At 904, a selection of a portion of the content on the display 104 is received. This selection may be received via data from the touch sensor 102, the one or more magnetometers 118 detecting the magnetic field of the stylus 110, or other input devices as clip content. For example, the user may underline at least a portion of the content using the tip of the stylus.

At 906, the clip content (or a copy thereof) is transferred to the virtual notebook while retaining a position of the clip content as presented on the display initially. As mentioned above, this position may be relative or absolute. In some implementations other information such as formatting, background images, contextual information such as user interface parameters, and so forth may be included.

At 908, at least a portion of the virtual notebook is presented including the clip content at the retained position. Continuing the example, the position of the figure of George Washington is presented in the same spot on the display 104 during the virtual notebook view as when presented in the eBook.

At 910, user annotations of the virtual notebook are received. These annotations may be received via the touch sensor 102, the one or more magnetometers 118 detecting the magnetic field from the stylus 110, or other input devices. For example, the user may make handwritten annotations, draw explanatory figures, erase notes, and so forth with the stylus 110.

Figure 10:
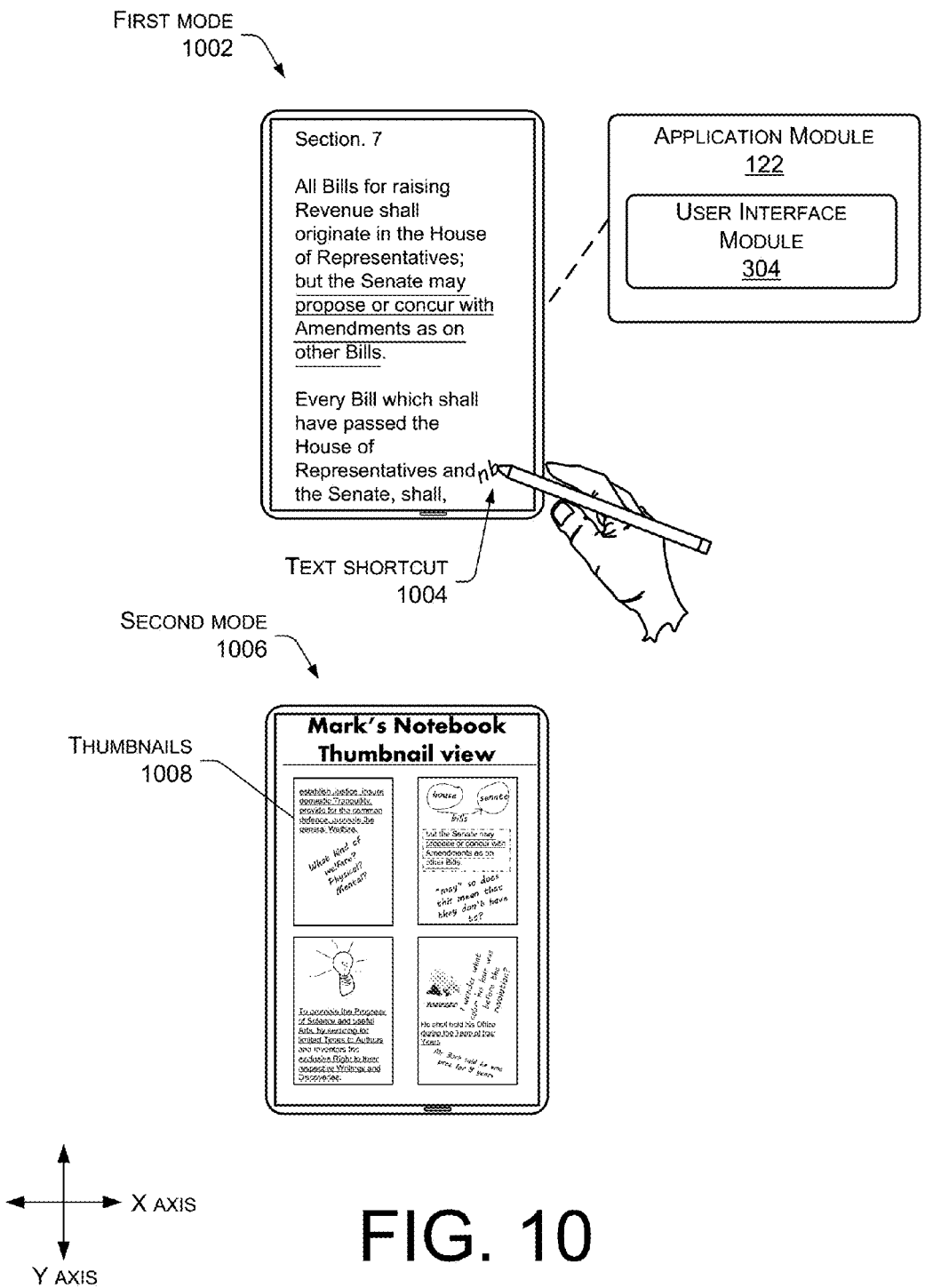
FIG. 10 depicts a thumbnail navigation view of the virtual notebook.

FIG. 10 depicts a thumbnail navigation view of the virtual notebook. As mentioned above, the virtual notebook maintains the position of clippings as presented prior to clipping. This may result in virtual notebook pages with a variety of different layouts. Even when the text is too small to be readable when forming a portion of a thumbnail image, or has been replaced by simpler elements such as rectangles or lines (also known as "greeking") the user may be able to find a particular point in the notebook based on the physical arrangement of the page.

Here, the user interface module 304 is operating in a first mode 1002 of displaying a page of an eBook, and receives a text shortcut 1004 via the touch sensor 102, the stylus 110, and the one or more magnetometers 118. This text shortcut 1004 comprises the handwritten text "nb" which may be pre-configured in the user interface module 304 to initiate opening of the notebook.

As shown in a second mode 1006, a thumbnail view may be presented in response to the text shortcut. A plurality of thumbnails 1008 may be shown, each providing a representation of a different page or set of pages within the virtual notebook. The thumbnails may be represented in various fidelities. For example, a high fidelity representation may comprise a reduced size image which contains the data of the full size image. A medium fidelity representation may comprise thumbnails where smaller text below a pre-determined size threshold has been replaced with blocks or lines (greeked). A low fidelity representation may be one in which all text is greeked and images are roughly sampled. The level of fidelity may be user selected, determined by processing or display constraints, or a combination thereof.

By viewing the plurality of thumbnails, the user may be able to quickly find a particular notebook page. By selecting the particular thumbnail, such as by tapping on it with the stylus 110, or encircling it with a line from the stylus 110, the user may select that thumbnail to be opened on the display 104.

Figure 11:
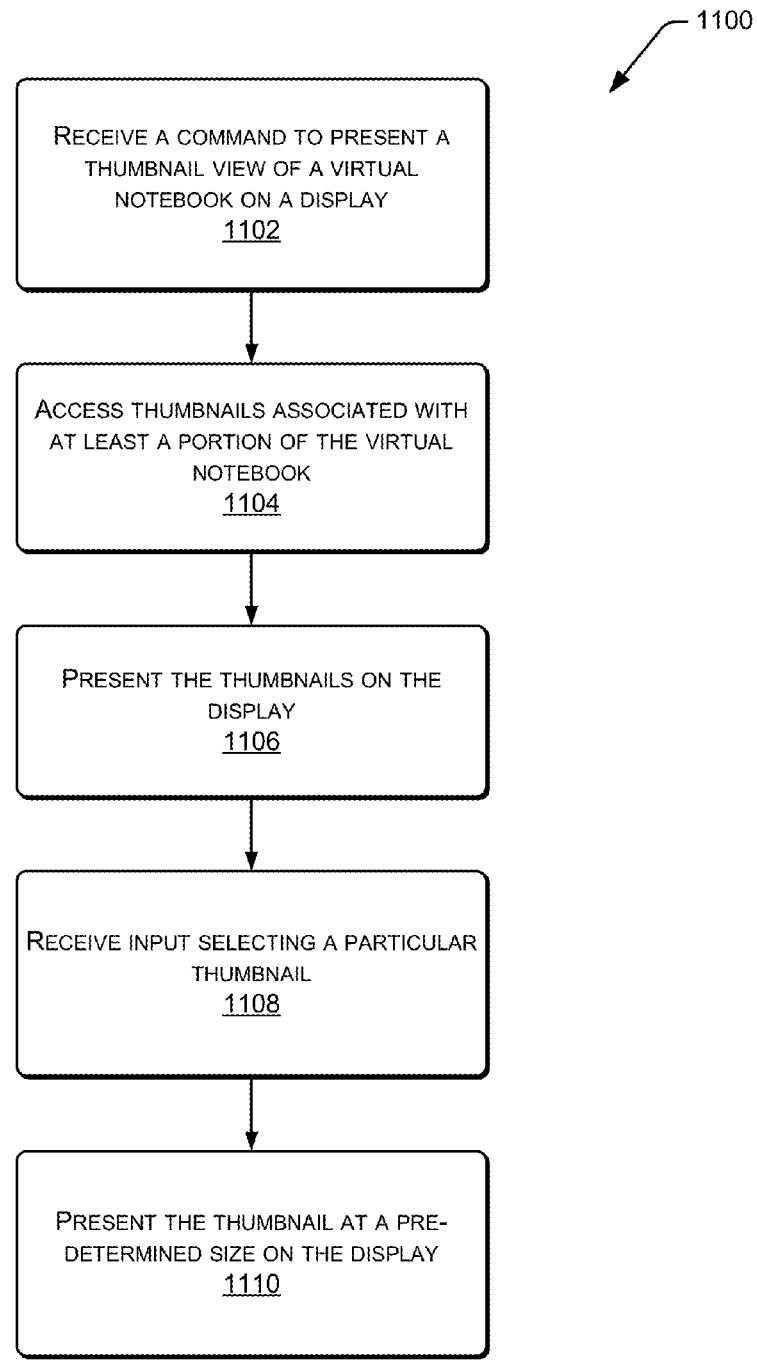
FIG. 11 is an illustrative process of navigating in the virtual notebook via the thumbnail view.

FIG. 11 is an illustrative process 1100 of navigating in the virtual notebook via the thumbnail view. At 1102, a command is received to present a thumbnail view of the virtual notebook on the display. For example, the command may comprise the handwritten "nb" text shortcut. This command may be received by the input module 106 from the touch sensor 102, the one or more magnetometers 118 detecting the magnetic field of the stylus 110, and so forth.

At 1104, thumbnails associated with at least a portion of the virtual notebook are accessed. For example, the thumbnails corresponding to a portion of the eBook current displayed may be retrieved from memory or generated.

At 1106, the thumbnails are presented on the display 104. At 1108, input is received selecting a particular thumbnail. As above, this input may be received by the input module 106 from the touch sensor 102, the one or more magnetometers 118 detecting the magnetic field of the stylus 110, and so forth. At 1110, the particular thumbnail is presented at a pre-determined size on the display 104. For example, the selected thumbnail may be presented at full or half its full size.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
a processor;
memory coupled to the processor;
a touch sensor coupled to the processor;
a reflective display coupled to the processor and configured to render at least a portion of an item of content; and
a user interface module stored in the memory and executable by the processor to:
detect an underline input gesture via the touch sensor, the underline input gesture selecting a word of the item of content being rendered on the display, the word being displayed at a first location on the display;
at least partly in response to detecting the underline input gesture:
present a raw underline underneath the word; and
present a processed underline underneath the word after presenting the raw underline;
detect an erasure input gesture via the touch sensor, the erasure input gesture corresponding to the processed underline; and
at least partly in response to detecting the erasure input gesture;
remove from the display a portion of the processed underline; and
transfer the portion of the processed underline directly to a location on a page in a virtual notebook, wherein the location on the page in the virtual notebook is substantially similar to the first location on the display.

2. The device of claim 1, wherein the touch sensor comprises an interpolating force-sensing resistance sensor and the reflective display comprises an electrophoretic display.

3. The device of claim 1, wherein the underline input gesture selects a portion of the word that is less than the entirety of the word, and the presenting of the processed underline comprises snapping the raw underline to the entirety of the word.

4. The device of claim 1, wherein the underline input gesture selects one or more letters, and the presenting of the processed underline comprises snapping the raw underline to the one or more letters.

5. The device of claim 1, wherein the underline input gesture comprises a user placing a stylus tip of a stylus in contact with the touch sensor and the processed underline results in a machine-generated underline rendered on the reflective display underneath the word.

6. The device of claim 1, wherein the underline input gesture comprises a user drawing a line with a stylus along a portion of a vertical margin on the reflective display and the word is adjacent to the portion of the vertical margin.

7. The device of claim 1, wherein the user interface module is further configured to merge two sets of underlines when the two sets of underlines are within a pre-determined distance of one another.

8. The device of claim 1, wherein the user interface module is further configured to separate into two sets of underlines a previously single underline.

9. The device of claim 1, wherein the raw underline comprises an underline generated prior to removal of contact with the touch sensor.

10. The device of claim 1, further comprising:
one or more magnetometers disposed about the device and coupled to the processor;
a magnetic stylus configured with a magnetic field detectable to the one or more magnetometers; and
the user interface module stored in the memory and executable by the processor further configured to:
further detect the underline input gesture via the input from the one or more magnetometers detecting the magnetic field of the magnetic stylus.

11. The device of claim 1, wherein the touch sensor comprises at least one or more magnetometers, the one or more magnetometers being coupled to the processor to detect a magnetic field associated with the display.

12. One or more non-transitory computer readable media comprising instructions, which when executed by one or more processors, cause the one or more processors to:
present at least a portion of an item of digital content on a display;
detect an input gesture corresponding to a word of the digital content being rendered on the display, the word being in a first location on the display;
determine a proximity of a first end of a stylus to the display based on a magnetic field generated by the stylus;
present a raw underline on the display underneath the word;
copy the word automatically to a first location on a page in a virtual notebook, wherein the first location on the page in the virtual notebook corresponds to a substantially similar location to the first location on the display;
determine that the first end of the stylus is no longer proximate to the display; and
present a processed underline on the display underneath the word after presenting the raw underline.

13. The one or more non-transitory computer readable media of claim 12, wherein:
the word is part of an image caption; and
the copying the word further comprises copying an image related to the image caption to a location on the page in the virtual notebook, wherein the location on the page in the virtual notebook corresponds to a location of the image on the display.

14. The one or more non-transitory computer readable media of claim 12, instructions, which when executed by the one or more processors, cause the one or more processors to snap the processed underline to the word.

15. The one or more non-transitory computer readable media of claim 12, further comprising instructions, which when executed by the one or more processors, cause the one or more processors to:
receive a command to present a thumbnail view of at least a portion of the virtual notebook on the display; and
present at least one page of the virtual notebook on the display as a thumbnail.

16. The one or more non-transitory computer readable media of claim 15, further comprising instructions, which when executed by the one or more processors, cause the one or more processors to:
receive input selecting the thumbnail; and
present the at least one page of the virtual notebook at a pre-determined size on the display.

17. The one or more computer readable media of claim 15, wherein the portion of the virtual notebook corresponds to the word copied to the virtual notebook.

18. The one or more non-transitory computer readable media of claim 12, wherein the substantially similar location comprises substantially the same location as the first location on the display.

19. A device comprising:
one or more processors;
one or more computer readable media coupled to the one or more processors;
a display coupled to the one or more processors and configured to render part of an item of content;
one or more magnetometers disposed about the device and coupled to the one or more processors to detect a magnetic field associated with the display; and
a user interface module stored in the one or more computer readable media, which when executed by the one or more processors, cause the one or more processors to:
detect a selection by a stylus, of a portion of the item of content rendered on the display, the portion being in a first location on the display;
determine a proximity of a first end of the stylus to the display based on data from the one or more magnetometers;
present a raw underline underneath the portion;
determine that the first end of the stylus is no longer proximate to the display;
present a processed underline underneath the portion after presenting the raw underline; and
copy the portion directly to a first location on a page in a virtual notebook, wherein the first location on the page in the virtual notebook corresponds to a substantially similar location to the first location on the display.

20. The device of claim 19, wherein the detecting the selection of the portion the item of content comprises detecting a user drawing a line along a vertical margin corresponding to the portion the item of content.

21. The device of claim 19, wherein the portion of the item of content comprises an image caption and the user interface module, when executed by the one or more processors, cause the one or more processors to copy the portion of the eBook and an image associated with the image caption to a location on a page in a virtual notebook, wherein the location on the page in a virtual notebook corresponds to a location of the portion of the item of content and the image on the display.

22. The device of claim 21, wherein the raw underline comprises an underline generated prior to removal of a contact with the item of content detected by the one or more magnetometers.

23. The device of claim 19, wherein the user interface module when executed by the one or more processors, cause the one or more processors to snap the raw underline underneath letters of the portion.

24. The device of claim 19, wherein the user interface module when executed by the one or more processors, cause the one or more processors to:
  to receive a command to present a thumbnail view of at least a portion of a virtual notebook on the display; and
  at least partly in response, present a thumbnail of at least one page of the virtual notebook on the display.

25. The device of claim 24, wherein the user interface module when executed by the one or more processors, cause the one or more processors to:
  receive input selecting the thumbnail; and
  at least partly in response, present the at least one page of the virtual notebook on the display.

26. The device of claim 19, wherein the item of digital content comprises an eBook.

* * * * *